US012808299B2

(12) United States Patent
Parekh et al.

(10) Patent No.: US 12,808,299 B2
(45) Date of Patent: Nov. 24, 2026

(54) THERMAL CONDITIONING ASSEMBLY FOR A GAS TURBINE ENGINE

(71) Applicant: RTX Corporation, Farmington, CT (US)

(72) Inventors: Kalpendu J. Parekh, Brookline, MA (US); Rishon Saftler, Glastonbury, CT (US); Daniel Carminati, Berlin, CT (US); John H. Mosley, Portland, CT (US); Jorn A. Glahn, Manchester, CT (US); Matthew P. Wilcox, Madison, CT (US); Xuejun Liu, Avon, CT (US); John P. Virtue, Jr., Middletown, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/049,484

(22) Filed: Feb. 10, 2025

(65) Prior Publication Data

US 2025/0257692 A1 Aug. 14, 2025

Related U.S. Application Data

(60) Provisional application No. 63/551,766, filed on Feb. 9, 2024.

(51) Int. Cl.
*F01D 5/08* (2006.01)
*F02C 7/18* (2006.01)

(52) U.S. Cl.
CPC ................ *F01D 5/082* (2013.01); *F02C 7/18* (2013.01); *F05D 2220/323* (2013.01)

(58) Field of Classification Search
CPC .......... F01D 5/081; F01D 5/082; F01D 5/084; F02C 7/18
See application file for complete search history.

(56) References Cited

U.S. PATENT DOCUMENTS 5,271,711 A 12/1993 Mcgreehan
5,586,860 A 12/1996 Bertrand
(Continued)

FOREIGN PATENT DOCUMENTS

DE 102016102049 A1 8/2017

OTHER PUBLICATIONS

EP Search Report for EP Patent Application No. 25156906.7 dated Aug. 28, 2025.

*Primary Examiner* — Andrew H Nguyen
(74) *Attorney, Agent, or Firm* — Getz Balich LLC

(57) ABSTRACT

A gas turbine engine includes a compressor, a turbine, and a rotational assembly. The compressor and the turbine form a core flow path. The rotational assembly includes a shaft, a compressor rotor, and a turbine rotor. The shaft interconnects the compressor rotor and the turbine rotor. The compressor rotor includes bladed rotor disks. The bladed rotor disks are spaced from the shaft to form an unobstructed passage. The bladed rotor disks form at least one forward rotor cavity and at least one aft cavity. The at least one forward rotor cavity and the at least one aft rotor cavity are connected in fluid communication by the unobstructed passage. The rotational assembly forms a thermal conditioning assembly. The thermal conditioning assembly includes air apertures formed by at least one of the bladed rotor disks. The air apertures extend from the core flow path to the at least one aft rotor cavity.

20 Claims, 4 Drawing Sheets

(56) References Cited

U.S. PATENT DOCUMENTS

| | | | | |
|---|---|---|---|---|
| 6,334,755 | B1 | 1/2002 | Coudray | |
| 7,585,148 | B2 | 9/2009 | Hoell | |
| 9,234,463 | B2 | 1/2016 | Benjamin | |
| 10,018,116 | B2 | 7/2018 | Ackermann | |
| 10,107,206 | B2 | 10/2018 | Forcier | |
| 2003/0101730 | A1 | 6/2003 | Hein | |
| 2003/0133788 | A1 | 7/2003 | Avignon | |
| 2006/0104808 | A1 | 5/2006 | Dailey | |
| 2008/0080972 | A1* | 4/2008 | Bunker | F01D 11/02 415/174.5 |
| 2008/0112793 | A1* | 5/2008 | Lee | F01D 5/082 416/232 |
| 2013/0192253 | A1* | 8/2013 | Ackermann | F01D 25/183 60/785 |
| 2013/0280028 | A1* | 10/2013 | Benjamin | F01D 5/082 415/177 |
| 2016/0024927 | A1 | 1/2016 | Baxley | |
| 2016/0069193 | A1* | 3/2016 | McCaffrey | F04D 29/321 416/1 |
| 2016/0215792 | A1 | 7/2016 | Hiester | |
| 2017/0002834 | A1* | 1/2017 | Powell | F04B 1/324 |
| 2018/0051580 | A1* | 2/2018 | Bunker | F01D 11/001 |
| 2019/0203600 | A1* | 7/2019 | Petrasko | F04D 29/582 |
| 2023/0296032 | A1* | 9/2023 | Townes | F01D 25/10 415/177 |

* cited by examiner

THERMAL CONDITIONING ASSEMBLY FOR A GAS TURBINE ENGINE

This application claims priority to U.S. Patent Appln. No. 63/551,766 filed Feb. 9, 2024, which is hereby incorporated herein by reference in its entirety.

BACKGROUND

1. Technical Field

This disclosure relates to a gas turbine engine for an aircraft propulsion system.

2. Background Information

Gas turbine engines, such as those used for aircraft propulsion, may frequently include compressor and turbine rotors which may be exposed to high-temperature conditions during operation. Gas turbine engines may generally include systems and features for controlling rotor temperatures and/or protecting rotors from high-temperature conditions. Various systems and methods are known in the art for controlling gas turbine engine rotor temperatures. While these known systems and methods may be useful for their intended purposes, there is always room in the art for improvement.

SUMMARY

According to an aspect of the present disclosure, a gas turbine engine of an aircraft propulsion system includes a first compressor, a first turbine, and a first rotational assembly. The first compressor forms a core flow path of the gas turbine engine. The first turbine further forms the core flow path. The first rotational assembly is configured for rotation about a rotational axis. The first rotational assembly includes a first shaft, a first compressor rotor of the first compressor, and a first turbine rotor of the first turbine. The first shaft interconnects the first compressor rotor and the first turbine rotor. The first compressor rotor includes a compressor rotor stack mounted to the first shaft. The compressor rotor stack includes a plurality of bladed compressor rotor disks. Each of the bladed compressor rotor disks is radially spaced from the first shaft to form an unobstructed passage radially between the plurality of bladed compressor rotor disks and the first shaft. The plurality of bladed compressor rotor disks includes at least one forward compressor rotor disk and at least one aft compressor rotor disk. The at least one forward compressor rotor disk forms at least one forward rotor cavity. The at least one aft compressor rotor disk forms at least one aft cavity. The at least one forward rotor cavity and the at least one aft rotor cavity are connected in fluid communication by the unobstructed passage. The first rotational assembly forms a thermal conditioning assembly. The thermal conditioning assembly includes a plurality of air apertures formed by the at least one aft compressor rotor disk. The plurality of air apertures extend from the core flow path in the first compressor to the at least one aft rotor cavity.

In any of the aspects or embodiments described above and herein, the first rotational assembly may be configured to direct high-pressure air from the core flow path, through the plurality of air apertures, through the at least one aft rotor cavity, to the first turbine.

In any of the aspects or embodiments described above and herein, each of the at least one forward compressor rotor disk may include a disk body and a plurality of compressor blades, the disk body may extend between and to an inner radial end and an outer radial end, the plurality of compressor blades may be disposed at the outer radial end, the outer radial end and the plurality of compressor blades may further form the core flow path, and the inner radial end may be radially spaced from the first shaft by the unobstructed passage.

In any of the aspects or embodiments described above and herein, the disk body of each of the at least one forward compressor rotor disk may be imperforate between the core flow path and the at least one forward rotor cavity.

In any of the aspects or embodiments described above and herein, the disk body of each of the at least one forward compressor rotor disks may be configured for passive temperature control of the at least one forward rotor cavity.

In any of the aspects or embodiments described above and herein, the thermal conditioning assembly may include an air flow discourager disposed at the inner radial end of a first forward compressor rotor disk of the at least one forward compressor rotor disk, and the air flow discourager may extend radially inward from the inner radial end toward the first shaft.

In any of the aspects or embodiments described above and herein, the thermal conditioning assembly may include an air flow discourager disposed at the first shaft, and the air flow discourager may extend radially outward from the first shaft toward the inner radial end of a first forward compressor rotor disk of the at least one forward compressor rotor disk.

In any of the aspects or embodiments described above and herein, the thermal conditioning assembly may include a plurality of air flow discouragers, a first portion of the plurality of air flow discouragers may be disposed at the inner radial end of a first forward compressor rotor disk of the at least one forward compressor rotor disk and extend radially inward from the inner radial end toward the first shaft, and a second portion of the plurality of air flow discouragers may be disposed at the first shaft and extend radially outward from the first shaft toward the inner radial end of the first forward compressor rotor disk of the at least one forward compressor rotor disk.

In any of the aspects or embodiments described above and herein, the thermal conditioning assembly may include a buffer air source, and the buffer air source may be isolated from the forward rotor cavities.

In any of the aspects or embodiments described above and herein, the thermal conditioning assembly may include a buffer air source, and the buffer air source may be configured to direct a conditioning air flow through the first shaft and into an interior cavity of the first shaft.

According to another aspect of the present disclosure, a gas turbine engine of an aircraft propulsion system includes a first compressor, a first turbine, and a first rotational assembly. The first compressor forms a core flow path of the gas turbine engine. The first turbine further forms the core flow path. The first rotational assembly is configured for rotation about a rotational axis. The first rotational assembly includes a first shaft, a first compressor rotor of the first compressor, and a first turbine rotor of the first turbine. The first shaft interconnects the first compressor rotor and the first turbine rotor. The first compressor rotor includes a compressor rotor stack mounted to the first shaft. The compressor rotor stack includes a plurality of bladed compressor rotor disks. Each of the bladed compressor rotor disks is radially adjacent and spaced from the first shaft to form an unobstructed passage extending along the first shaft radially between the plurality of bladed compressor rotor disks and the first shaft. The plurality of bladed compressor rotor disks form at least one forward rotor cavity and at least one aft cavity. The at least one forward rotor cavity and the at least one aft rotor cavity are connected in fluid communication by the unobstructed passage. The first rotational assembly forms a thermal conditioning assembly. The thermal conditioning assembly includes a plurality of air apertures formed by at least one of the plurality of compressor rotor disks. The plurality of air apertures extend from the core flow path in the first compressor to the at least one aft rotor cavity.

In any of the aspects or embodiments described above and herein, the thermal conditioning assembly may include an air flow discourager disposed at an inner radial end of one of the plurality of bladed compressor rotor disks, the air flow discourager may be disposed within the unobstructed passage between the at least one forward rotor cavity and the at least one aft rotor cavity, and the air flow discourager may extend radially inward from the inner radial end toward the first shaft.

In any of the aspects or embodiments described above and herein, the thermal conditioning assembly may include an air flow discourager disposed at one of the plurality of bladed compressor rotor disks, the air flow discourager may be disposed within the unobstructed passage between the at least one forward rotor cavity and the at least one aft rotor cavity, and the air flow discourager may extend radially outward from the first shaft toward an inner radial end of the one of the plurality of bladed compressor rotor disks.

In any of the aspects or embodiments described above and herein, the first rotational assembly may be configured to direct high-pressure air from the core flow path, through the plurality of air apertures, through the at least one aft rotor cavity, to the first turbine.

In any of the aspects or embodiments described above and herein, each of the plurality of bladed compressor rotor disks may be an integrally bladed rotor.

According to another aspect of the present disclosure, a gas turbine engine of an aircraft propulsion system includes a first compressor, a first turbine, and a first rotational assembly. The first compressor forms a core flow path of the gas turbine engine. The first turbine further forms the core flow path. The first rotational assembly is configured for rotation about a rotational axis. The first rotational assembly includes a first shaft, a first compressor rotor of the first compressor, and a first turbine rotor of the first turbine. The first shaft interconnects the first compressor rotor and the first turbine rotor. The first compressor rotor includes a compressor rotor stack mounted to the first shaft. The compressor rotor stack includes a plurality of bladed compressor rotor disks. The plurality of bladed compressor rotor disks includes a forward-most compressor rotor disk and an aft-most compressor rotor disk. Each of the bladed compressor rotor disks is radially spaced from the first shaft to form an unobstructed passage radially between the plurality of bladed compressor rotor disks and the first shaft. The unobstructed passage extends axially from the forward-most compressor rotor disk to the aft-most compressor rotor disk. The plurality of bladed compressor rotor disks includes at least one forward compressor rotor disk and at least one aft compressor rotor disk. The at least one forward compressor rotor disk includes the forward-most compressor rotor disk and forms at least one forward rotor cavity. The at least one aft compressor rotor disk includes the aft-most compressor rotor disk and forms at least one aft cavity. The at least one forward rotor cavity and the at least one aft rotor cavity are connected in fluid communication by the unobstructed passage. The first rotational assembly forms a thermal conditioning assembly. The thermal conditioning assembly includes a plurality of air apertures formed by the at least one aft compressor rotor disk. The plurality of air apertures extend from the core flow path in the first compressor to the at least one aft rotor cavity. The first rotational assembly forms a high-pressure air flow path extending from the core flow path, through the plurality of air apertures, through the at least one aft rotor cavity, through the unobstructed passage, to the first turbine rotor.

In any of the aspects or embodiments described above and herein, the thermal conditioning assembly may include an air flow discourager disposed at a first forward compressor rotor disk of the at least one forward compressor rotor disk, and the air flow discourager may extend radially inward from the first forward compressor rotor disk toward the first shaft.

In any of the aspects or embodiments described above and herein, the thermal conditioning assembly may include an air flow discourager disposed at the first shaft and the unobstructed passage, and the air flow discourager may extend radially outward from the first shaft toward a first forward compressor rotor disk of the at least one forward compressor rotor disk.

In any of the aspects or embodiments described above and herein, the thermal conditioning assembly may include a plurality of air flow discouragers, a first portion of the plurality of air flow discouragers may be disposed at a first forward compressor rotor disk of the at least one forward compressor rotor disk and extend radially inward from first forward compressor rotor disk toward the first shaft, and a second portion of the plurality of air flow discouragers may be disposed at the first shaft and extend radially outward from the first shaft toward the first forward compressor rotor disk of the at least one forward compressor rotor disk.

In any of the aspects or embodiments described above and herein, each of the at least one forward compressor rotor disk may include a disk body and a plurality of compressor blades, the disk body may extend between and to an inner radial end and an outer radial end, the plurality of compressor blades may be disposed at the outer radial end, the outer radial end and the plurality of compressor blades may further form the core flow path, and the inner radial end may be radially spaced from the first shaft by the unobstructed passage.

DETAILED DESCRIPTION

Figure 1:
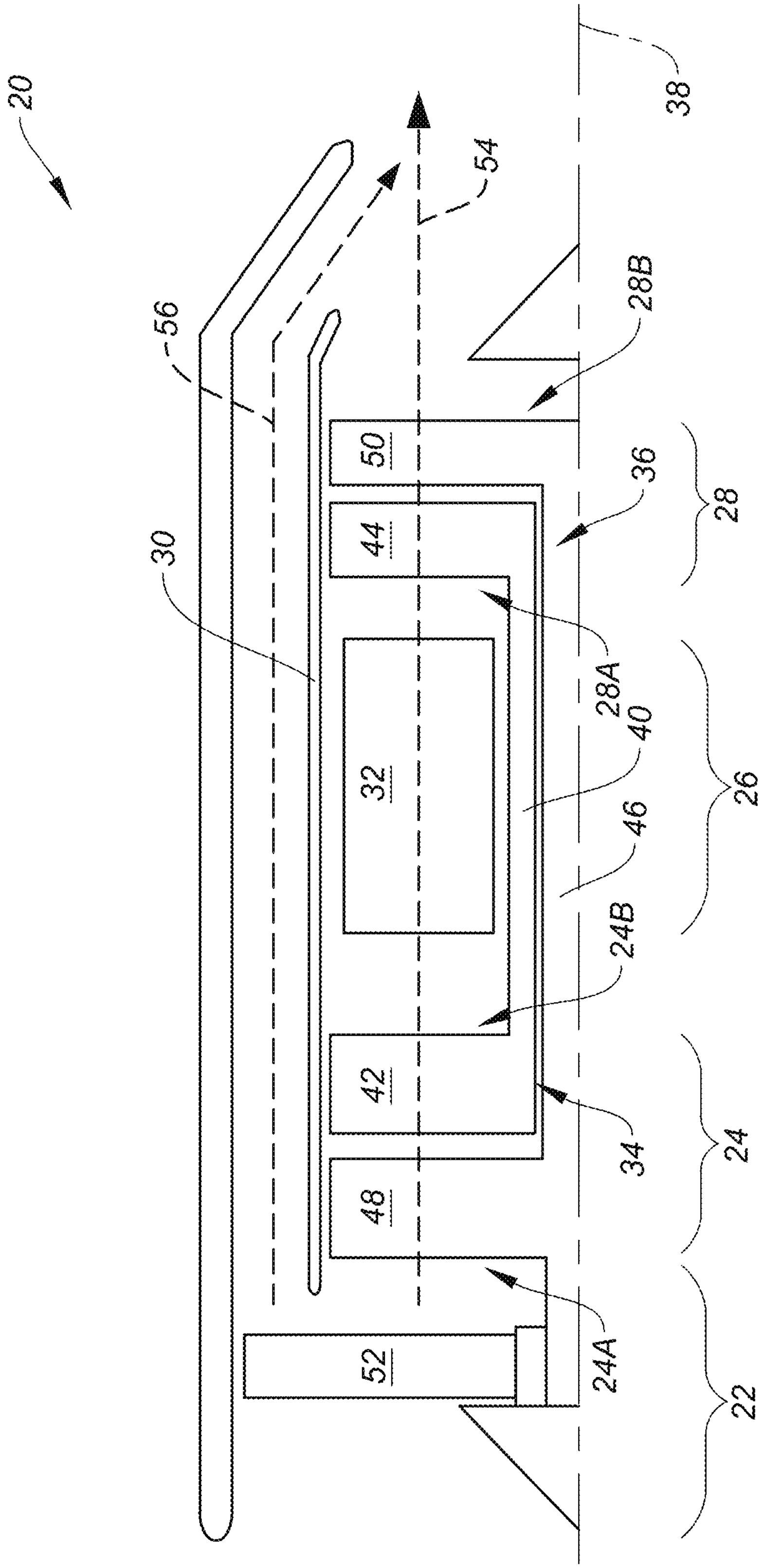
FIG. 1 schematically illustrates a cutaway, side view of a gas turbine engine for an aircraft propulsion system, in accordance with one or more embodiments of the present disclosure.

FIG. 1 schematically illustrates a gas turbine engine 20. The gas turbine engine 20 of FIG. 1 is a multi-spool turbofan gas turbine engine for an aircraft propulsion system. However, while the following description and accompanying drawings may refer to the turbofan gas turbine engine of FIG. 1 as an example, it should be understood that aspects of the present disclosure may be equally applicable to other types of gas turbine engines including, but not limited to, a turboshaft gas turbine engine, a turboprop gas turbine engine, a turbojet gas turbine engine, a propfan gas turbine engine, or an open rotor gas turbine engine.

The gas turbine engine 20 of FIG. 1 includes a fan section 22, a compressor section 24, a combustor section 26, a turbine section 28, and an engine static structure 30. The compressor section 24 of FIG. 1 includes a low-pressure compressor (LPC) 24A and a high-pressure compressor (HPC) 24B. The combustor section 26 includes a combustor 32 (e.g., an annular combustor). The turbine section 28 includes a high-pressure turbine (HPT) 28A and a low-pressure turbine (LPT) 28B.

Components of the fan section 22, the compressor section 24, and the turbine section 28 form a first rotational assembly 34 (e.g., a high-pressure spool) and a second rotational assembly 36 (e.g., a low-pressure spool) of the gas turbine engine 20. The first rotational assembly 34 and the second rotational assembly 36 are mounted for rotation about a rotational axis 38 (e.g., an axial centerline of the gas turbine engine 20) relative to the engine static structure 30.

The first rotational assembly 34 includes a first shaft 40, a first compressor rotor 42 for the high-pressure compressor 24B, and a first turbine rotor 44 for the high-pressure turbine 28A. The first shaft 40 interconnects the first compressor rotor 42 and the first turbine rotor 44.

The second rotational assembly 36 includes a second shaft 46, a second compressor rotor 48 for the low-pressure compressor 24A, and a second turbine rotor 50 for the low-pressure turbine 28B. The second shaft 46 interconnects the second compressor rotor 48 and the second turbine rotor 50. The second shaft 46 may additionally be directly or indirectly coupled to a bladed fan rotor 52 for the fan section 22. For example, the second shaft 46 may be coupled to the bladed fan rotor 52 (e.g., an input shaft of the bladed fan rotor 52) by a reduction gear assembly configured to drive the bladed fan rotor 52 at a reduced rotational speed relative to the second shaft 46. The first shaft 40 and the second shaft 46 are concentric and configured to rotate about the rotational axis 38. The present disclosure, however, is not limited to concentric configurations of the first shaft 40 and the second shaft 46.

The engine static structure 30 may include one or more engine cases, cowlings, bearing assemblies, and/or other non-rotating structures configured to house and/or support (e.g., rotationally support) components of the gas turbine engine 20 sections 22, 24, 26, 28. The engine static structure 30 may form an exterior (e.g., an outer radial portion) of the gas turbine engine 20.

In operation of the gas turbine engine 20 of FIG. 1, ambient air is directed through the fan section 22 and into a core flow path 54 (e.g., an annular flow path) and a bypass flow path 56 (e.g., an annular flow path) by rotation of the bladed fan rotor 52. Airflow along the core flow path 54 is compressed by the low-pressure compressor 24A and the high-pressure compressor 24B, mixed and burned with fuel in the combustor 32, and then directed through the high-pressure turbine 28A and the low-pressure turbine 28B. The first turbine rotor 44 and the second turbine rotor 50 rotationally drive the first rotational assembly 34 and the second rotational assembly 36, respectively, in response to the combustion gas flow through the high-pressure turbine 28A and the low-pressure turbine 28B. The bypass flow path 56 may be disposed outside the engine static structure 30. For example, the engine static structure 30 and an outer aircraft propulsion system housing (e.g., a nacelle) may form an annular bypass duct radially therebetween, and airflow may be directed through the annular bypass duct along the bypass flow path 56.

Figure 2:
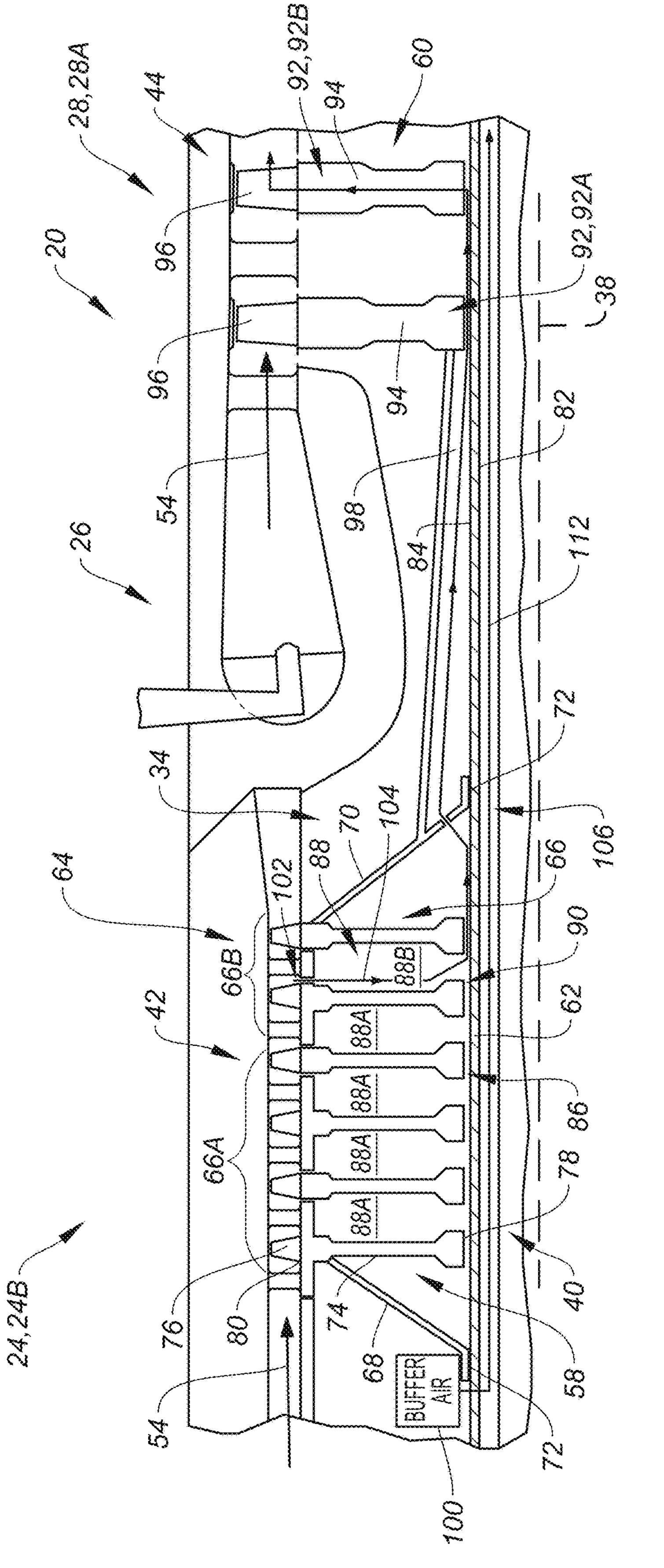
FIG. 2 schematically illustrates a cutaway, side view of a portion of the gas turbine engine of FIG. 1, in accordance with one or more embodiments of the present disclosure.

FIG. 2 illustrates a cutaway, side view of the compressor section 24, the combustor section 26, and the turbine section 28 showing the first rotational assembly 34. The first compressor rotor 42 of FIG. 2 includes a compressor rotor stack 58. The first turbine rotor 44 of FIG. 2 includes a turbine rotor stack 60. The compressor rotor stack 58 and the turbine rotor stack 60 are mounted to or otherwise disposed at (e.g., on, adjacent, or proximate) a tie shaft 62 of the first shaft 40. Components of the first rotational assembly 34 form a thermal conditioning assembly 64 for the compressor rotor stack 58 and the turbine rotor stack 60.

The compressor rotor stack 58 includes a plurality of axially distributed (e.g., axially spaced apart) bladed compressor rotor disks 66. The compressor rotor stack 58 of FIG. 2 includes six bladed compressor rotor disks 66, however, the present disclosure is not limited to any particular number of bladed compressor rotor disks 66 for the compressor rotor stack 58. The bladed compressor rotor disks 66 are assembled together (e.g., stacked) along the tie shaft 62. For example, the bladed compressor rotor disks 66 may be axially mounted (e.g., compressed) together to form the compressor rotor stack 58. The bladed compressor rotor disks 66 may be axially compressed, for example, between a forward rotor plate 68 and an aft rotor plate 70 mounted on the tie shaft 62. The forward rotor plate 68 and the aft rotor plate 70 may be held in place axially abutting the compressor rotor stack 58 by one or more tie shaft nuts 72 in threaded engagement with the tie shaft 62. In this configuration, the bladed compressor rotor disks 66 may not be directly mounted to or disposed on the tie shaft 62, as will be discussed in further detail. The present disclosure, however, is not limited to the foregoing exemplary mounting configuration of the compressor rotor stack 58 at (e.g., on, adjacent, or proximate) the tie shaft 62.

The bladed compressor rotor disks 66 of FIG. 2 are arranged as one or more forward compressor rotor disks 66A (e.g., axially forward and/or upstream compressor rotor disks) and one or more aft compressor rotor disks 66B (e.g., axially aft and/or downstream compressor rotor disks). The one or more forward compressor rotor disks 66A include one or more of the compressor rotor disks 66. Similarly, the one or more aft compressor rotor disks 66B include one or more of the compressor rotor disks 66. The forward compressor rotor disks 66A and the aft compressor rotor disks 66B, together, include all of the compressor rotor disks 66 (e.g., all of the compressor rotor disks 66 for the first compressor rotor 42). The aft compressor rotor disks 66B are disposed aftward of and axially adjacent the forward compressor rotor disks 66A.

Each of the bladed compressor rotor disks 66 includes a disk body 74 and a plurality of compressor blades 76. The disk body 74 is an annular body extending circumferentially about (e.g., completely around) the rotational axis 38. The disk body 74 extends between and to an inner radial end 78 of the disk body 74 and an outer radial end 80 of the disk body 74. The inner radial end 78 is disposed radially outward of the tie shaft 62. The outer radial end 80, with the compressor blades 76, forms a portion of the core flow path 54 through the high-pressure compressor 24B. The compressor blades 76 are disposed at (e.g., on, adjacent, or proximate) the outer radial end 80 within the core flow path 54. The compressor blades 76 may be mounted to disk body 74. Alternatively, the disk body 74 and the compressor blades 76 may be configured as an integrally bladed rotor (IBR; sometimes called a "blisk" or "bladed disk").

The tie shaft 62 of FIG. 2 extends axially through the compressor section 24, the combustor section 26, and the turbine section 28. The tie shaft 62 may be mounted to or otherwise form a portion of the first shaft 40. The tie shaft 62 extends circumferentially about (e.g., completely around) the rotational axis 38. The tie shaft 62 includes an inner radial side 82 of the tie shaft 62 and an outer radial side 84 of the tie shaft 62. The inner radial side 82 faces away from the bladed compressor rotor disks 66 and toward the rotational axis 38. The outer radial side 84 faces the bladed compressor rotor disks 66. The outer radial side 84 is spaced (e.g., radially spaced) from the inner radial end 78 of the disk body 74 for each of the bladed compressor rotor disks 66 by a radial gap 86.

The bladed compressor rotor disks 66 form a plurality of rotor cavities 88 within the compressor rotor stack 58. Each of the rotor cavities 88 is disposed between (e.g., axially between) and formed by an adjacent pair of the bladed compressor rotor disks 66. Each of the rotor cavities 88 is disposed between (e.g., radially between) and the adjacent pair of the bladed compressor rotor disks 66 (e.g., at the outer radial end 80) and the tie shaft 62. The rotor cavities 88 are interconnected in fluid communication by a passage 90. For example, each of the rotor cavities 88 of FIG. 2 are interconnected in fluid communication by the passage 90. The passage 90 may be understood as an unobstructed passage in that fluid (e.g., air) may flow through the passage between each of the rotor cavities 88. In other words, passage 90 is unobstructed in that the first rotational assembly 34 does not include a seal or other component (e.g., extending between and to the tie shaft 62 and the disk body 74 for one or more of the bladed compressor rotor disks 66) which prevents or substantially prevents the flow of fluid (e.g., air) through the passage 90 between the rotor cavities 88. The passage 90 extends through the high-pressure compressor 24B along the tie shaft 62 (e.g., the outer radial side 84). The passage 90 is formed by the radial gap 86 between the disk body 74 (e.g., the inner radial end 78) and the tie shaft 62 (e.g., the outer radial side 84) for each of the bladed compressor rotor disks 66.

The rotor cavities 88 of FIG. 2 are arranged as one or more forward rotor cavities 88A (e.g., axially forward and/or upstream rotor cavities) and one or more aft rotor cavities 88B (e.g., axially aft and/or downstream rotor cavities). Each of the forward rotor cavities 88A is disposed axially at (e.g., on, adjacent, or proximate) one of the forward compressor rotor disks 66A. For example, each of the forward rotor cavities 88A may be formed by an adjacent pair of the forward compressor rotor disks 66A. Alternatively, one of the forward rotor cavities 88A may be formed between (e.g., axially between) one of the forward compressor rotor disks 66A and one of the aft compressor rotor disks 66B. Each of the aft rotor cavities 88B is formed by an adjacent pair of the aft compressor rotor disks 66B. The rotor cavities 88 of FIG. 2 include one aft rotor cavity 88B, however, the present disclosure is not limited to any particular number of aft rotor cavities 88B. The forward rotor cavities 88A are connected in fluid communication with the aft rotor cavities 88B through the passage 90, for example, as described above.

The turbine rotor stack 60 includes a plurality of axially distributed (e.g., axially spaced apart) bladed turbine rotor disks 92. The turbine rotor stack 60 of FIG. 2 includes two bladed turbine rotor disks 92, however, the present disclosure is not limited to any particular number of bladed turbine rotor disks 92 for the turbine rotor stack 60. Each of the bladed turbine rotor disks 92 includes a disk body 94 and a plurality of turbine blades 96. The disk body 94 is an annular body extending circumferentially about (e.g., completely around) the rotational axis 38. The turbine blades 96 are mounted to or otherwise disposed at (e.g., on, adjacent, or proximate) the disk body 94 within the core flow path 54. The disk body 94 and the turbine blades 96 form a portion of the core flow path 54 through the high-pressure turbine 28A. The bladed turbine rotor disks 92 include a first-stage bladed turbine rotor disk 92A and a second stage bladed turbine rotor disk 92B. The first-stage bladed turbine rotor disk 92A is disposed upstream of (e.g., axially forward of) the second-stage bladed turbine rotor disk 92B with respect to the core flow path 54. The turbine rotor stack 60 (e.g., radially inner portions of the turbine rotor stack 60) may be disposed at (e.g., on, adjacent, or proximate) a turbine cavity 98. The turbine cavity 98 may be disposed, for example, between (e.g., axially between) the turbine rotor stack 60 and the compressor rotor stack 58 and/or between (e.g., radially between) the turbine rotor stack 60 and the tie shaft 62. The turbine cavity 98 may be connected in fluid communication with the rotor cavities 88.

The thermal conditioning assembly 64 includes components of the first rotational assembly 34 (e.g., the first shaft 40, the first compressor rotor 42, and the first turbine rotor 44). The thermal conditioning assembly 64 may additionally include a buffer air source 100. The thermal conditioning assembly 64 is configured to provide thermal conditioning (e.g., temperature control) for components of the first rotational assembly 34 during operation of the gas turbine engine 20. In particular, the thermal conditioning assembly 64 of FIG. 2 is configured to facilitate differential thermal conditioning (e.g., localized heating, cooling, or other temperature control) of the forward compressor rotor disks 66A and the forward rotor cavities 88A relative to the aft compressor rotor disks 66B and the aft rotor cavities 88B to selectively control operating temperatures of the rotor disks 66A, 66B and the rotor cavities 88A, 88B.

The thermal conditioning assembly 64 of FIG. 2 includes a plurality of high-pressure air apertures 102. The high-pressure air apertures 102 may be formed by the disk body 74 of one or more of the aft compressor rotor disks 66B. For example, the high-pressure air apertures 102 may be formed through the disk body 74, at (e.g., on, adjacent, or proximate) the outer radial end 80, between and to the core flow path 54 and a respective one of the aft rotor cavities 88B. The high-pressure air apertures 102 may be circumferentially distributed on the disk body 74 of one or more of the aft compressor rotor disks 66B, relative to the rotational axis 38. The high-pressure air apertures 102 are configured to direct a high-pressure air 104 from the core flow path 54 in the high-pressure compressor 24B (e.g., an outlet or intermediate stage of the high-pressure compressor 24B) to one or more of the aft rotor cavities 88B.

The thermal conditioning assembly 64 of FIG. 2 is configured to passively control temperatures of the forward compressor rotor disks 66 and the forward rotor cavities 88A, for example, by fluidly isolating the forward rotor cavities 88A from substantial air flow therethrough during operation of the gas turbine engine 20, as will be discussed in further detail. The disk body 74 for each of the forward compressor rotor disks 66A may be imperforate (e.g., may not include weep holes or other fluid apertures) or substantially imperforate such that fluid (e.g., air) within the forward rotor cavities 88A does not flow through the disk body 74 for each of the forward compressor rotor disks 66A, for example, from the forward rotor cavities 88A to the core flow path 54. Similarly, the tie shaft 62 may also be imperforate or substantially imperforate along the rotor cavities 88 and passage 90. The forward rotor cavities 88A may be isolated from sources of compressed air (e.g., other than the high-pressure air 104) such as, but not limited to, compressed air from the buffer air source 100 or the like. In some embodiments, however, the forward compressor rotor disks 66 may be configured with perforations to facilitate a relatively small amount of air flow through the forward rotor cavities 88A.

The buffer air source 100 may be configured to receive compressed air from the low-pressure compressor 24A and/or the high-pressure compressor 24B for operation and cooling of one or more bearing systems (e.g., bearing compartment buffer air), shaft (e.g., the second shaft 46) cooling, or the like. As described above, the buffer air source 100 of FIG. 2 is isolated from the rotor cavities 88. The buffer air source 100 of FIG. 2 is connected in fluid communication with an interior cavity 106 formed by the inner radial side 82, to facilitate cooling of the tie shaft 62. For example, the buffer air source 100 may be configured to direction a cooling air 112 flow through the tie shaft 62 and into the interior cavity 106.

Figure 3B:
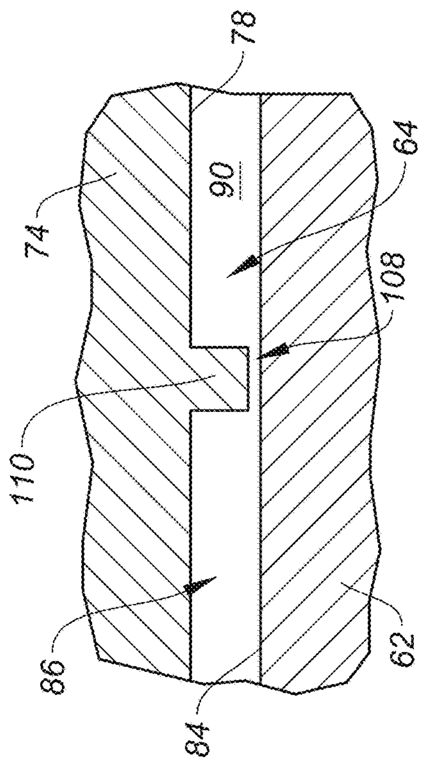
FIGS. 3A-C schematically illustrate cutaway, side views of various flow discourager configurations, in accordance with one or more embodiments of the present disclosure.
Figure 3C:
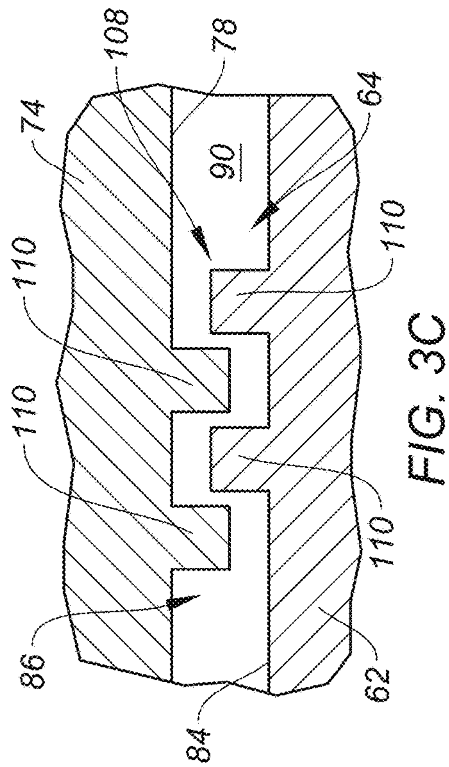
Figure 3A:
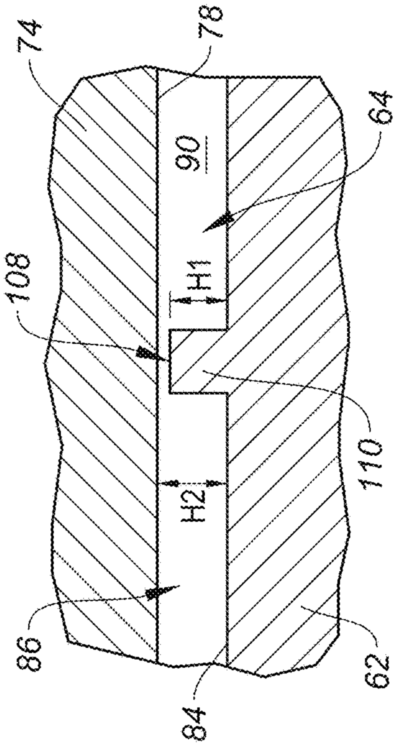

As shown in FIGS. 3A-C, the thermal conditioning assembly 64 may include one or more air flow discouragers 108. Each of the discouragers 108 may be positioned between (e.g., radially between) the outer radial side 84 and one of the forward compressor rotor disks 66A (e.g., the disk body 74) within the passage 90 to reduce and/or restrict fluid (e.g., air) flow through the passage 90. Each of the discouragers 108 may include a discourager body 110. The discourager body 110 may be an annular body extending circumferentially about (e.g., completely around) the rotational axis 38. As shown in FIG. 3A, the discourager body 110 may be disposed at (e.g., on, adjacent, or proximate) the outer radial side 84. For example, the discourager body 110 may be mounted to the outer radial side 84 or otherwise formed by the tie shaft 62 at (e.g., on, adjacent, or proximate) the outer radial side 84. The discourager body 110 of FIG. 3A extends radially outward from the outer radial side 84 by a radial height H1, but may not contact the disk body 74 for one of the forward compressor rotor disks 66A. In other words, the radial height H1 may be less than a gap height H2 for the radial gap 86. Alternatively, the discourager body 110 may extend radially outward from the outer radial side 84 and contact the disk body 74 for one of the forward compressor rotor disks 66A. In this alternative configuration of the discourager body 110, the discourager body 110 may be circumferentially segmented. Similarly, as shown in FIG. 3B, the discourager body 110 may be disposed at (e.g., on, adjacent, or proximate) the inner radial end 78. For example, the discourager body 110 may be mounted to the inner radial end 78 or otherwise formed by the disk body 74 at (e.g., on, adjacent, or proximate) the inner radial end 78. The discourager body 110 of FIG. 3B extends radially inward from the inner radial end 78, but may not contact the tie shaft 62. Alternatively, the discourager body 110 may extend radially inward from the inner radial end 78 and contact the tie shaft 62. In this alternative configuration of the discourager body 110, the discourager body 110 may be circumferentially segmented. As shown in FIG. 3C, one or more of the discouragers 108 may be disposed on the outer radial side 84 at (e.g., on, adjacent, or proximate) an axial location of the disk body 74 of one of the forward compressor rotor disks 66A and one or more of the discouragers 108 may be disposed on the inner radial end 78 of the disk body 74 of that one of the forward compressor rotor disks 66A. For example, the discouragers 108 may be axial staggered between the outer radial side 84 and the inner radial end 78 to form a labyrinth flow path through the passage 90. The discouragers 108 may be disposed between the tie shaft 62 and one, more than one, or all of the forward compressor rotor disks 66A.

In operation of the gas turbine engine 20, the thermal conditioning assembly 64 may facilitate temperature control of the forward compressor rotor disks 66A (and associated forward rotor cavities 88A), the aft compressor rotor disks 66B (and associated aft rotor cavities 88B), and the turbine rotor disks 92. Compressor air from the high-pressure compressor 24B is directed through the high-pressure air apertures 102 into the rotor cavities 88 as the high-pressure air 104. This high-pressure air 104 is directed between (e.g., axially between) adjacent pairs of the aft compressor rotor disks 66B to facilitate cooling of the aft compressor rotor disks 66B. This high-pressure air 104 is then directed from the aft rotor cavities 88B to the turbine cavity 98 to facilitate cooling of the turbine rotor disks 92. The high-pressure air 104 may be directed through one or more additional cavities between the aft rotor cavities 88B and the turbine cavity 98 (e.g., a cavity between the bladed compressor rotor disks 66 and the aft rotor plate 70). The high-pressure air 104 flow through the turbine cavity 98 facilitates cooling of the disk body 94 for the turbine rotor disks 92. The high-pressure air 104 is additionally directed through the disk body 94 (e.g., one or more cooling apertures) of the disk body 94 of the second-stage bladed turbine rotor disk 92B and into and through the turbine blades 96 (e.g., one or more internal cooling cavities, cooling holes, and the like) of the second-stage bladed turbine rotor disk 92B. The forward rotor cavities 88A are isolated, as discussed above, and the flow of the high-pressure air 104 through the passage 90 pressurizes the forward rotor cavities 88A, thereby preventing or substantially preventing air flow through the forward rotor cavities 88A. It should be noted that some amount of high-pressure air from the forward rotor cavities 88A may flow (e.g., leak) between axially adjacent forward compressor rotor disks 66A, however, this air flow may be understood as minimal, the air flow may not constitute substantial air flow through the forward rotor cavities 88A, and/or the air flow may be understood may constitute some amount of dedicated air flow through the forward rotor cavities 88A.

In particular, the thermal conditioning assembly 64 of FIG. 2 facilitates temperature control of the forward compressor rotor disks 66A, the aft compressor rotor disks 66B, the disk body 94 for each of the first-stage bladed turbine rotor disk 92A and the second-stage bladed turbine rotor disk 92B, and the turbine blades 96 for the second-stage bladed turbine rotor disk 92B, using a single source of air flow (e.g., the high-pressure air 104 through the high-pressure air apertures 102), while also accounting for the differential operating temperature requirements and cooling needs of components of the compressor section 24 and the turbine section 28. For example, the aft compressor rotor disks 66B and the turbine rotor disks 92 may be exposed to significantly greater temperatures than the forward rotor disks 66A during operation of the gas turbine engine 20. Accordingly, the high-pressure air 104 is directed to flow through the aft rotor cavities 88B, the turbine cavity 98, and the second-stage bladed turbine rotor disk 92B with a relative high flow rate to facilitate cooling of the aft compressor rotor disks 66B and the turbine rotor disks 92. In contrast, temperatures of the forward compressor rotor disks

66A are passively controlled (e.g., using no or substantially no high-pressure air 104 flow), whereby heat transfer through the disk body 74 of each of the forward compressor rotor disks 66A and natural convection within the forward rotor cavities 88A facilitates suitable cooling of the forward compressor rotor disks 66A without a need for an additional cooling source. As noted above, the disk body 74 and the compressor blades 76 may be configured as an integrally bladed rotor (IBR). IBR compressor rotor configurations may demonstrate improve heat transfer characteristics in comparison to at least some other compressor rotor configurations and may, therefore, be particularly useful for implementation of aspects of the present disclosure.

Figure 4:
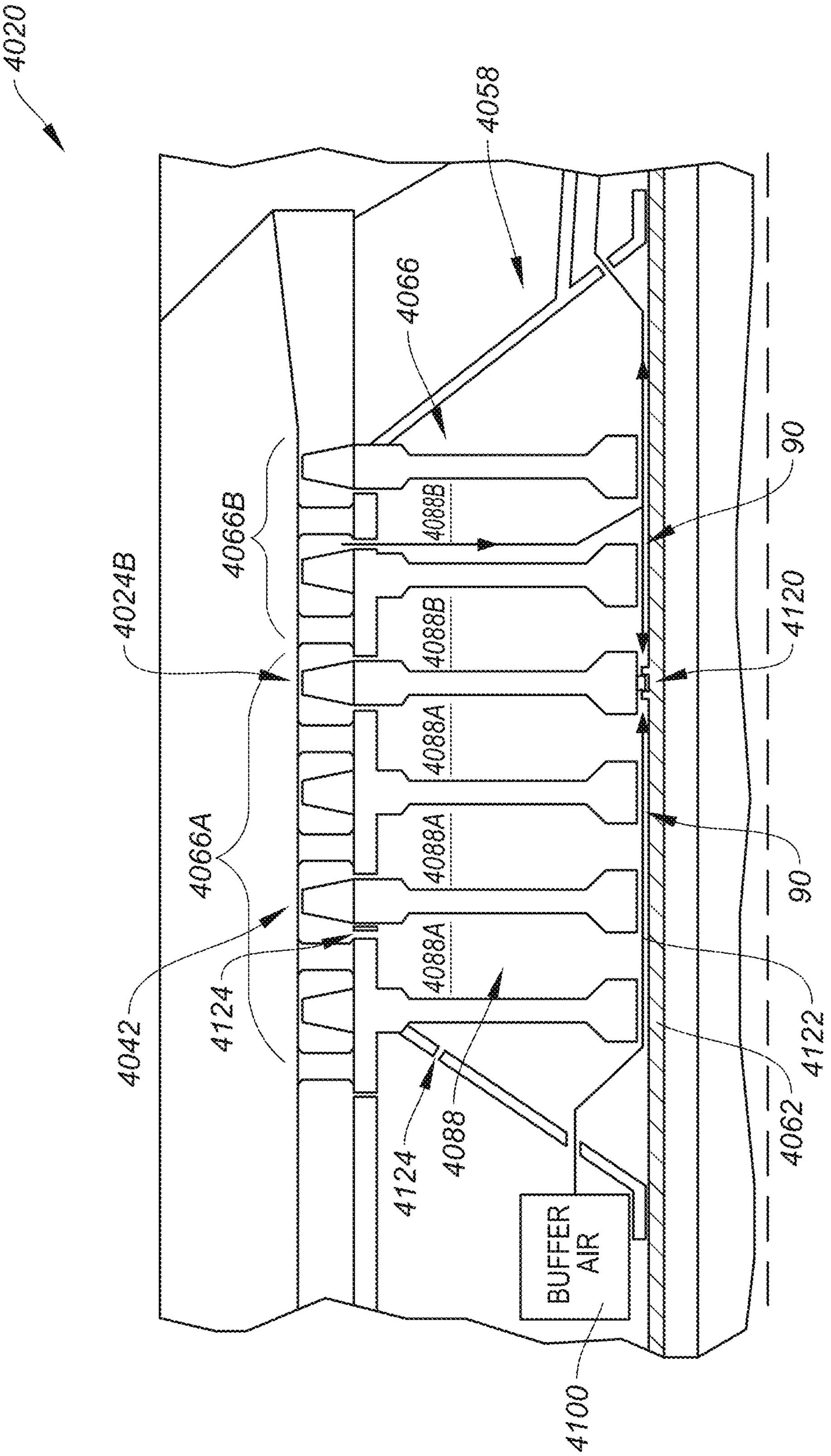
FIG. 4 schematically illustrates a cutaway, side view of a portion of another gas turbine engine, in accordance with one or more embodiments of the present disclosure.

FIG. 4 illustrates an alternative gas turbine engine 400 configuration. Similar to the gas turbine engine 20, the gas turbine engine 4020 includes a high-pressure compressor 4024B and a compressor rotor 4042 for the high-pressure compressor 4024B. The compressor rotor 4042 includes a compressor rotor stack 4058 mounted on a shaft 4062. The compressor rotor stack 4058 includes a plurality of compressor rotor disks 4066 arranged as one or more forward compressor rotor disks 4066A and one or more aft compressor rotor disks 4066B. The forward compressor rotor disks 4066A form one or more forward rotor cavities 4088A and the aft compressor rotor disks 4066B form one or more aft rotor cavities 4088B. A passage 4090 extends between the forward rotor cavities 4088A and the aft rotor cavities 4088B along the shaft 4062. The forward rotor cavities 4088A and the aft rotor cavities 4088B of FIG. 4 are isolated (e.g., fluidly isolated) from one another by a seal 4120 disposed within the passage 4090. The seal 4120 extends between and to the shaft 4062 and one of the compressor rotor disks 4066 to isolate the forward rotor cavities 4088A from the aft rotor cavities 4088B. The seal 4120 extends between and physically connects the one of the compressor rotor disks 4066 to the shaft 4062. A high-pressure air 4102 is directed into and through one or more of the aft rotor cavities 4088B from the high-pressure compressor 4024B. The forward rotor cavities 4088A and associated forward compressor rotor disks 4066A are cooled by a different conditioning air flow 4122 provided, for example, by a buffer air source 4100 connected in fluid communication with the forward rotor cavities 4088A. The conditioning air flow 4122 may be directed through the forward rotor cavities 4088A and out of the forward rotor cavities 4088A through one or more outlet holes 4124 (e.g., weep holes) formed by or through the forward compressor rotor disks 4066A (e.g., disk bodies of the forward compressor rotor disks 4066A) or other components of the compressor rotor 4042.

However, we have found that, during operation of the gas turbine engine 400, the seal 4120 may be exposed to extreme loads leading to accelerated seal 4120 wear and fluid leakage. Use of the seal 4120 to isolate the forward rotor cavities 4088A from the aft rotor cavities 4088B may impart undesirable vibration on the gas turbine engine 4020 during operation, for example, as a result of the seal 4120 leakage and/or wear. We have also found that the conditioning air flow 4122 (e.g., from the buffer air source 4100) may cool the forward compressor rotor disks 4066A than may be needed by the forward compressor rotor disks 4066A during operation of the gas turbine engine 4020. Connecting the buffer air source 4100 in fluid communication with the forward rotor cavities 4088A may additionally complicate buffer air source 4100 complexity (e.g., with external plumbing, valves, and software logic for buffer air flow control). By eliminating the use of a buffer air source (e.g., the buffer air source 100) for the thermal conditioning assembly 64, the buffer air source may alternatively be sized and controlled with a focus on bearing buffering.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

The terms "substantially," "about," "approximately," and other similar terms of approximation used throughout this patent application are intended to encompass variations or ranges that are reasonable and customary in the relevant field. These terms should be construed as allowing for variations that do not alter the basic essence or functionality of the invention. Such variations may include, but are not limited to, variations due to manufacturing tolerances, materials used, or inherent characteristics of the elements described in the claims, and should be understood as falling within the scope of the claims unless explicitly stated otherwise.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures--such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

What is claimed is:

1. A gas turbine engine of an aircraft propulsion system, the gas turbine engine comprising:

a first compressor forming a core flow path of the gas turbine engine;

a first turbine further forming the core flow path; and a first rotational assembly configured for rotation about a rotational axis, the first rotational assembly includes a first shaft, a first compressor rotor of the first compressor, and a first turbine rotor of the first turbine, the first shaft interconnects the first compressor rotor and the first turbine rotor, the first compressor rotor includes a compressor rotor stack mounted to the first shaft, the compressor rotor stack includes a plurality of bladed compressor rotor disks arranged between a forward axial end of the first compressor rotor and an aft axial end of the first compressor rotor, each of the bladed compressor rotor disks is radially spaced from the first shaft to form a passage radially between the plurality of bladed compressor rotor disks and the first shaft, the passage configured to permit fluid flow therethrough, the plurality of bladed compressor rotor disks includes at least one forward compressor rotor disk and at least one aft compressor rotor disk, the at least one forward compressor rotor disk includes each of the plurality of bladed compressor rotor disks between the forward axial end and the at least one aft compressor rotor disk, the at least one aft compressor rotor disk includes each of the plurality of bladed compressor rotor disks between the aft axial end and the at least one forward compressor rotor disk, each of the at least one forward compressor rotor disk forms at least one forward rotor cavity, each of the at least one aft compressor rotor disk forms at least one aft rotor cavity, and each forward rotor cavity is connected in fluid communication with each aft rotor cavity by the passage, and the first rotational assembly forms a thermal conditioning assembly, the thermal conditioning assembly includes a plurality of air apertures formed by the at least one aft compressor rotor disk, and the plurality of air apertures extend from the core flow path in the first compressor to the at least one each aft rotor cavity.

2. The gas turbine engine of claim 1, wherein the first rotational assembly is configured to direct high-pressure air from the core flow path, through the plurality of air apertures, through each aft rotor cavity, to the first turbine.

3. The gas turbine engine of claim 1, wherein each of the at least one forward compressor rotor disk includes a disk body and a plurality of compressor blades, the disk body extends between and to an inner radial end and an outer radial end, the plurality of compressor blades are disposed at the outer radial end, the outer radial end and the plurality of compressor blades further form the core flow path, and the inner radial end is radially spaced from the first shaft by the passage.

4. The gas turbine engine of claim 3, wherein the disk body of each of the at least one forward compressor rotor disk is imperforate between the core flow path and each forward rotor cavity.

5. The gas turbine engine of claim 4, wherein the disk body of each of the at least one forward compressor rotor disks is configured for passive temperature control of each forward rotor cavity.

6. The gas turbine engine of claim 4, wherein the thermal conditioning assembly includes an air flow discourager disposed at the inner radial end of a first forward compressor rotor disk of the at least one forward compressor rotor disk, and the air flow discourager extends radially inward from the inner radial end toward the first shaft.

7. The gas turbine engine of claim 4, wherein the thermal conditioning assembly includes an air flow discourager disposed at the first shaft, and the air flow discourager extends radially outward from the first shaft toward the inner radial end of a first forward compressor rotor disk of the at least one forward compressor rotor disk.

8. The gas turbine engine of claim 4, wherein the thermal conditioning assembly includes a plurality of air flow discouragers, a first portion of the plurality of air flow discouragers are disposed at the inner radial end of a first forward compressor rotor disk of the at least one forward compressor rotor disk and extend radially inward from the inner radial end toward the first shaft, and a second portion of the plurality of air flow discouragers are disposed at the first shaft and extend radially outward from the first shaft toward the inner radial end of the first forward compressor rotor disk of the at least one forward compressor rotor disk.

9. The gas turbine engine of claim 1, wherein the thermal conditioning assembly includes a buffer air source, and the buffer air source is isolated from each forward rotor cavity.

10. The gas turbine engine of claim 1, wherein the thermal conditioning assembly includes a buffer air source, and the buffer air source is configured to direct a conditioning air flow through the first shaft and into an interior cavity of the first shaft.

11. A gas turbine engine of an aircraft propulsion system, the gas turbine engine comprising:

a first compressor forming a core flow path of the gas turbine engine;

a first turbine further forming the core flow path; and a first rotational assembly configured for rotation about a rotational axis, the first rotational assembly includes a first shaft, a first compressor rotor of the first compressor, and a first turbine rotor of the first turbine, the first shaft interconnects the first compressor rotor and the first turbine rotor, the first compressor rotor includes a compressor rotor stack mounted to the first shaft, the compressor rotor stack includes a plurality of bladed compressor rotor disks from a forward axial end of the first compressor rotor to an aft axial end of the first compressor rotor, each of the bladed compressor rotor disks is radially adjacent and spaced from the first shaft to form a passage extending along the first shaft radially between the plurality of bladed compressor rotor disks and the first shaft, the passage is configured to permit fluid flow therethrough, each of the plurality of bladed compressor rotor disks form at least one forward rotor cavity and/or at least one aft rotor cavity between the forward axial end and the aft axial end, and each forward rotor cavity and each aft rotor cavity are connected in fluid communication by the unobstructed passage, and the first rotational assembly forms a thermal conditioning assembly, the thermal conditioning assembly includes a plurality of air apertures formed by at least one of the plurality of compressor rotor disks, and the plurality of air apertures extend from the core flow path in the first compressor to each aft rotor cavity;

wherein the thermal conditioning assembly includes a buffer air source, the buffer air source is isolated from each forward rotor cavity, and the buffer air source configured to receive compressed air from the first compressor.

12. The gas turbine engine of claim 11, wherein the thermal conditioning assembly includes an air flow discourager disposed at an inner radial end of one of the plurality of bladed compressor rotor disks, the air flow discourager is disposed within the passage between each forward rotor cavity and each aft rotor cavity, and the air flow discourager extends radially inward from the inner radial end toward the first shaft.

13. The gas turbine engine of claim 11, wherein the thermal conditioning assembly includes an air flow discourager disposed at one of the plurality of bladed compressor rotor disks, the air flow discourager is disposed within the passage between each forward rotor cavity and each aft rotor cavity, and the air flow discourager extends radially outward from the first shaft toward an inner radial end of the one of the plurality of bladed compressor rotor disks.

14. The gas turbine engine of claim 11, wherein the first rotational assembly is configured to direct high-pressure air from the core flow path, through the plurality of air apertures, through each aft rotor cavity, to the first turbine.

15. The gas turbine engine of claim 11, wherein each of the plurality of bladed compressor rotor disks is an integrally bladed rotor.

16. A gas turbine engine of an aircraft propulsion system, the gas turbine engine comprising:

a first compressor forming a core flow path of the gas turbine engine;

a first turbine further forming the core flow path; and a first rotational assembly configured for rotation about a rotational axis, the first rotational assembly includes a first shaft, a first compressor rotor of the first compressor, and a first turbine rotor of the first turbine, the first shaft interconnects the first compressor rotor and the first turbine rotor, the first compressor rotor includes a compressor rotor stack mounted to the first shaft, the compressor rotor stack includes a plurality of bladed compressor rotor disks, the plurality of bladed compressor rotor disks includes a forward-most compressor rotor disk and an aft-most compressor rotor disk, each of the bladed compressor rotor disks is radially spaced from the first shaft to form a passage radially between the plurality of bladed compressor rotor disks and the first shaft, the passage configured to permit fluid flow therethrough, the passage extends axially from the forward-most compressor rotor disk to the aft-most compressor rotor disk, the plurality of bladed compressor rotor disks includes at least one forward compressor rotor disk and at least one aft compressor rotor disk, the at least one forward compressor rotor disk includes the forward-most compressor rotor disk and the forward-most compressor rotor disk forms at least one forward rotor cavity, the at least one aft compressor rotor disk includes the aft-most compressor rotor disk and the aft-most compressor rotor disk forms at least one aft rotor cavity, and each forward rotor cavity and each aft rotor cavity are connected in fluid communication by the passage, the first rotational assembly forms a thermal conditioning assembly, the thermal conditioning assembly includes a plurality of air apertures formed by the at least one aft compressor rotor disk, the plurality of air apertures extend from the core flow path in the first compressor to each aft rotor cavity, the first rotational assembly forms a high-pressure air flow path extending from the core flow path, through the plurality of air apertures, through each aft rotor cavity, through the passage, to the first turbine rotor;

wherein the first turbine rotor comprises a turbine disk body and turbine disk blade, the turbine disk body comprising one or more or more cooling apertures; and wherein the high-pressure air flow path further extends through the one or more cooling apertures of the turbine disk body.

17. The gas turbine engine of claim 16, wherein the thermal conditioning assembly includes an air flow discourager disposed at a first forward compressor rotor disk of the at least one forward compressor rotor disk, and the air flow discourager extends radially inward from the first forward compressor rotor disk toward the first shaft.

18. The gas turbine engine of claim 16, wherein the thermal conditioning assembly includes an air flow discourager disposed at the first shaft and the unobstructed passage, and the air flow discourager extends radially outward from the first shaft toward a first forward compressor rotor disk of the at least one forward compressor rotor disk.

19. The gas turbine engine of claim 16, wherein the thermal conditioning assembly includes a plurality of air flow discouragers, a first portion of the plurality of air flow discouragers are disposed at a first forward compressor rotor disk of the at least one forward compressor rotor disk and extend radially inward from the first forward compressor rotor disk toward the first shaft, and a second portion of the plurality of air flow discouragers are disposed at the first shaft and extend radially outward from the first shaft toward the first forward compressor rotor disk of the at least one forward compressor rotor disk.

20. The gas turbine engine of claim 16, wherein each of the at least one forward compressor rotor disk includes a disk body and a plurality of compressor blades, the disk body extends between and to an inner radial end and an outer radial end, the plurality of compressor blades are disposed at the outer radial end, the outer radial end and the plurality of compressor blades further form the core flow path, and the inner radial end is radially spaced from the first shaft by the passage.

* * * * *